(12) United States Patent
Cash et al.

(10) Patent No.: US 8,354,793 B2
(45) Date of Patent: Jan. 15, 2013

(54) MODULATED LIGHT DETECTION SYSTEM

(75) Inventors: Audwin Cash, Stuart, FL (US); James Bears, Boynton Beach, FL (US); Michael Romeo, Port St. Lucie, FL (US)

(73) Assignee: Solar Outdoor Lighting, Inc., Palm City, FL (US)

( * ) Notice: Subject to any disclaimer, the term of this patent is extended or adjusted under 35 U.S.C. 154(b) by 392 days.

(21) Appl. No.: 12/819,168

(22) Filed: Jun. 18, 2010

(65) Prior Publication Data

US 2011/0309753 A1   Dec. 22, 2011

(51) Int. Cl.
*H05B 37/00* (2006.01)

(52) U.S. Cl. .......................... 315/150; 315/151; 315/158

(58) Field of Classification Search .................. 315/158, 315/159, 157, 155, 156, 149, 150, 151
See application file for complete search history.

(56) References Cited

U.S. PATENT DOCUMENTS

| | | | |
|---|---|---|---|
| 3,483,429 A | 12/1969 | Engel et al. | |
| 4,209,728 A | 6/1980 | Membreno | |
| 4,281,365 A | 7/1981 | Elving et al. | |
| 4,319,133 A | 3/1982 | Currie et al. | |
| 4,449,074 A | 5/1984 | Luchaco | |
| 4,587,459 A | 5/1986 | Blake | |
| 4,631,675 A | 12/1986 | Jacobsen et al. | |
| 4,827,119 A | 5/1989 | Gaboury | |
| 5,455,487 A * | 10/1995 | Mix et al. | 315/150 |
| 5,808,294 A | 9/1998 | Neumann | |
| 5,990,628 A | 11/1999 | Birrell | |
| 6,396,040 B1 | 5/2002 | Hill | |
| RE38,036 E | 3/2003 | Neumann | |
| 6,541,754 B2 | 4/2003 | Matsuyama | |
| 7,288,755 B1 | 10/2007 | Fassbender et al. | |
| 7,504,612 B2 | 3/2009 | Yu et al. | |
| 8,237,734 B2 * | 8/2012 | Yang | 345/589 |

* cited by examiner

*Primary Examiner* — David H Vu
(74) *Attorney, Agent, or Firm* — Novak Druce + Quigg LLP

(57) ABSTRACT

A lighting system distinguishes between light from natural and manmade sources to prevent the system's light source from being inadvertently deactivated due to light received from manmade light sources. A sensor converts received light into electrical energy. The system light source and/or some other external light source can emit light with a modulation. The system includes a modulation detector that can detect the modulation in the electrical energy received from the sensor. A system controller selectively adjusts the flow of electrical energy to the system light source responsive to the electrical signals from the sensor. The controller adjusts the flow of electrical energy in response to the non-modulated component of the electrical signals from the sensor. The controller does not adjust the flow of electrical energy in response to the modulated component of the electrical signals from the sensor.

28 Claims, 2 Drawing Sheets

MODULATED LIGHT DETECTION SYSTEM

FIELD OF THE INVENTION

The invention relates in general to lighting systems and, more particular, to nighttime lighting systems.

BACKGROUND OF THE INVENTION

Many outdoor lighting systems are configured to be activated from dusk until dawn. One example of such a system is a solar powered street light. As the sun sets, the amount of current or voltage of the electrical energy generated by the photovoltaic panel decreases. A system controller can detect this decrease in current or voltage. Once the amount of current or voltage falls below a predetermined threshold, the controller can turn on the street light. The light can remain on until the current or voltage of the electrical energy generated by the photovoltaic panel again exceeds a predetermined threshold. For instance, as the sun rises and its light energy impinges on the photovoltaic panel, the amount of current or voltage generated by the photovoltaic panel can increase. When the amount of current or voltage exceeds the predetermined threshold, the system controller can turn off the street light.

However, the presence of nearby manmade light sources can interfere with the desired operation of the system. For example, light energy from the street light itself may impinge on the photovoltaic panel, which, alone or in combination with light energy from other sources, may be able to generate sufficient current or voltage to exceed the predetermined threshold. In such case, the controller will turn off the street light. With the light off, the amount of current or voltage of the electrical energy generated by the photovoltaic panel will decrease, eventually to an amount below the predetermined threshold, which will cause the controller to turn on the streetlight again. Such on-off cycling of the light may repeat throughout the entire night.

In addition, light energy from other nearby light sources, like other street lights, building lighting, sign lighting, and/or stadium lights, may also impinge upon the photovoltaic panel. These nearby light sources can contribute to the repeated on-off cycling of the street light or may keep the street light off for long periods of time during the night, if not for the entire night. Without a way to distinguish between light from natural sources and light from itself or from other manmade sources, the system may not work in the intended manner, thereby frustrating the very purpose of the system.

Thus, there is a need for a system that can minimize such concerns.

SUMMARY OF THE INVENTION

Embodiments of the invention are directed to a lighting system. In one implementation, the system includes a system light source is at least partially powered by an electrical energy source. The system light source emits system light when activated. The system light includes modulation.

The system also includes a sensor adapted to convert light received thereby into electrical signals. The sensor generates electrical signals having a modulated component when the system light impinges on the sensor. The sensor generates electrical signals having a non-modulated component when light from a natural source impinges on the sensor. The sensor can be one or more solar cells. The sensor can be a photo detector and/or a photodiode.

The system further includes a controller. The controller can selectively adjust the flow of electrical energy between the electrical energy source and the system light source responsive to the electrical signals from the sensor. The controller adjusts the flow of electrical energy in response to the non-modulated component and does not adjust the flow of electrical energy in response to the modulated component.

The system can further include a modulation detector operatively connected to receive the electrical signals from the sensor and detect any modulated component. The modulation detector can filter the modulated component in the electrical signals sent to the controller.

The modulation can be a predetermined modulation. The modulation may or may not be perceptible to the human eye. The modulation can be a variation in at least one of amplitude, waveform, phase or frequency of the light emitted from the system light source. In one embodiment, a predetermined modulation can be applied to the light from the system light source only during an initial interval when the system light source is activated. In another embodiment, the light from the system light source can be modulated continuously while the system light source is activated. The light from the system light source can be modulated periodically while the system light source is activated.

The energy source can be an energy storage device operatively connected to supply electrical energy to the system light source. The energy storage device can be a battery. The energy source can be an electrical grid operatively connected to supply electrical energy to the system light source. The energy source can be operatively connected to the sensor to receive and store electrical signals generated by the sensor.

In another implementation, a lighting system includes a system light source, a sensor and a controller. The system light source is at least partially powered by an electrical energy source. The energy source can be operatively connected to the sensor to receive and store electrical signals generated by the sensor.

The sensor is adapted to convert light received thereby into electrical signals. The sensor receives light from an external manmade light source that emits light including a modulation. As a result, the electrical signals generated by the sensor include at least a modulated component. The sensor can be at least one solar cell, a photo detector or a photodiode. The external light source can be one of street lights, stadium lights, signage, advertising displays or decorative lights.

The controller selectively adjusts the flow of electrical energy between the electrical energy source and the system light source responsive to the electrical signals from the sensor. The controller adjusts the flow of electrical energy in response to the non-modulated component and does not adjust the flow of electrical energy in response to the modulated component.

The lighting system can further include a modulation detector operatively connected to receive the electrical signals from the sensor. The modulation detector can be operatively connected to the controller to selectively increase or decrease the supply of electrical energy from the energy source to the system light source. The modulation detector can be configured to detect the modulated component in the electrical signals generated by the sensor such that, when the modulated component is detected by the modulation detector, the modulated component is ignored. The modulated component can be filtered or processed so that it is not presented to the controller or so that it is distinguishable from a non-modulated component.

The modulation can be a predetermined modulation. The modulation may or may not be perceptible to the human eye. The modulation can be a variation in at least one of amplitude, waveform, phase or frequency of the light emitted from the external light source. The modulation can be applied to the light from the external light source only at the time the external light source is activated. The modulation can be applied to the light from the external light source continuously while the external light source is activated. The modulation can be periodically applied to the light from the external light source while the external light source is activated.

The system light source can emit light when activated. The light can have a second modulation. The sensor can receive light from the system light source such that the electrical signals generated by the sensor include at least a modulated component corresponding to the second modulation. When the modulated component corresponding to the second modulation is detected by the modulation detector, the modulated component corresponding to the second modulation can be ignored. In one embodiment, the modulation and the second modulation can be different.

DETAILED DESCRIPTION OF EMBODIMENTS OF THE INVENTION

Embodiments of the invention are directed to lighting systems and methods that can distinguish between illumination from manmade and natural light sources. Embodiments of the invention shown and described herein are only exemplary in nature. It will be understood that the invention is not limited to the illustrated structure or application.

Figure 1:
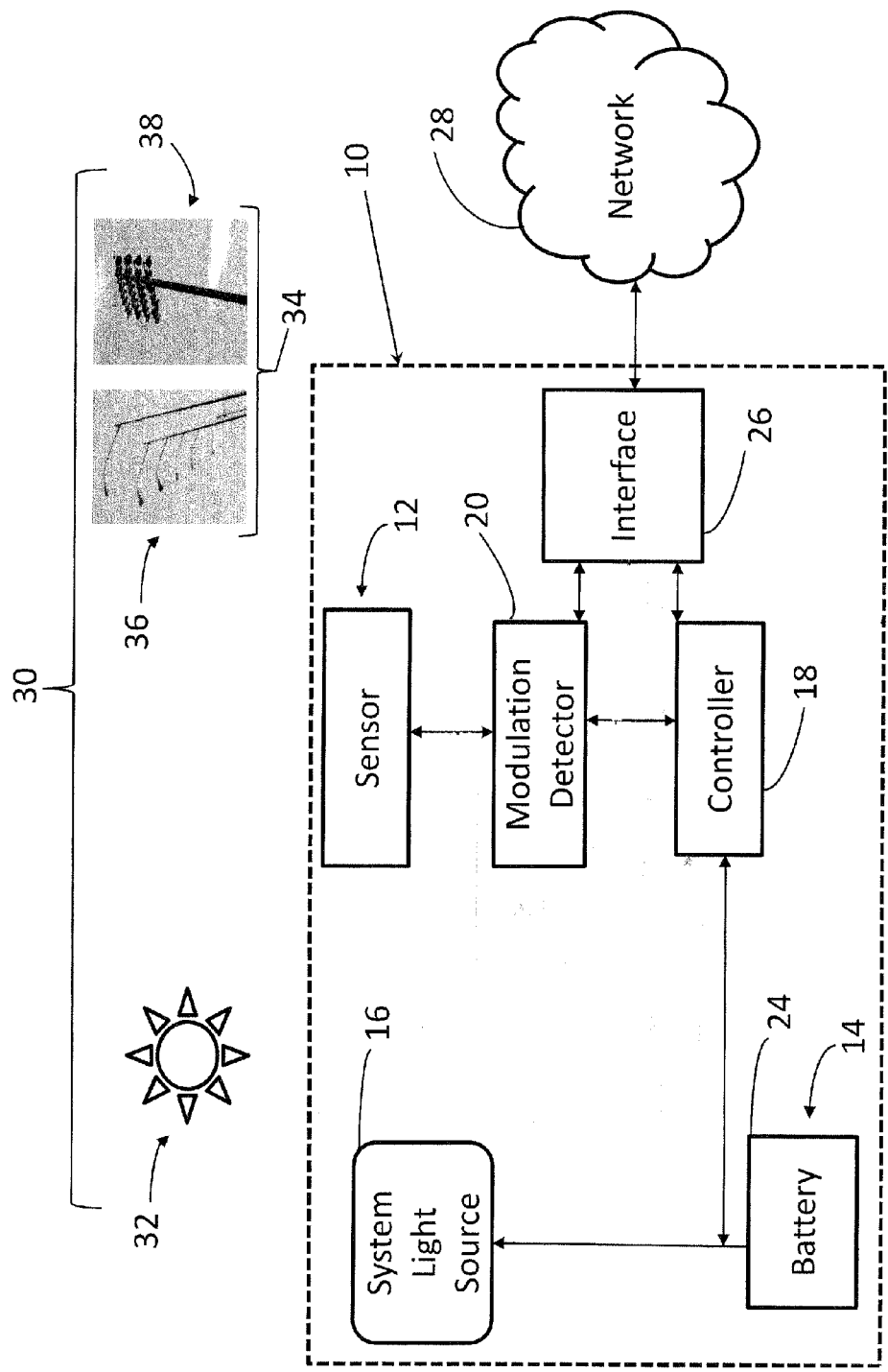
FIG. 1 shows one embodiment of a lighting system that distinguishes light from natural sources and light from manmade sources in accordance with aspects of the invention.

FIG. 1 shows an example of a lighting system 10 according to aspects of the invention. The system 10 can include a sensor 12, an energy source 14, a system light source 16, a controller 18 and a modulation detector 20. Each of the components of the system will now be described.

The sensor 12 can be any component or group of components capable of receiving light from natural and manmade sources and converting the received light into electrical signals. The electrical signals can have an associated incident light metric, which can be, for example, current and/or voltage. The sensor 12 can be a photovoltaic cell, panel or array, or it can be a photodiode or a photodetector. A natural light source is one that generates any type of light by non-manmade elements, such as the sun. A manmade light source is one that generates any type of light by manmade components, such as halogen, fluorescent, high intensity discharge and/or gas discharge lamps. If the light energy received by the sensor 12 includes modulation, then the modulation will appear in the electrical signals as a modulated component thereof.

The energy source 14 can be any component or group of components that can supply suitable electrical energy. The energy source 14 can be an electrical grid, that is, an interconnected network for delivering electrical energy to consumers of electrical energy. In such case, the energy source 14 can be, for example, an electrical outlet or wall socket. In some instances, the energy source 14 may not be associated with an electrical grid. For example, the energy source 14 can be an energy storage device, which can be any component or group of components capable of receiving and storing electrical energy for consumption. In one embodiment, the energy storage device can be a rechargeable battery 24. The energy source 14 can be operatively connected to the system light source 16 so that the system light source 16 can receive electrical energy therefrom. The term "operatively connected," as used herein, can include direct and indirect connections. In some instances, the energy source 14 can be operatively connected to the sensor 12 to receive and store electrical energy generated by the sensor 12, for example, when the sensor 12 also functions as a photovoltaic cell and the energy source 14 is a battery.

The system can include a system light source 16, which can be at least partially electrically powered. The energy source 14 can be operatively connected to deliver electrical energy to the system light source 16. The system light source 16 can be any suitable electrically powered device that can generate or emit any type of light. In one embodiment, the system light source 16 can be one or more light emitting diodes. Embodiments of the invention are not limited to light emitting diodes, as any suitable system light source 16 can be used. For instance, the system light source 16 can be a halogen, fluorescent, high intensity discharge and/or gas discharge lamp, just to name a few possibilities.

The system light source 16 can be used in connection with any suitable application. For example, the system light source 16 can be part of an outdoor lighting system, such as in connection with a street light, landscape lighting, security lighting, yard lighting, parking lot lighting, signage or advertising displays. The system light source 16 can be located on or in a structure, such as a house, building, or portable restroom. It will be understood that other types of devices are contemplated, and the system light source 16 is not limited to being any particular type of light source.

The system 10 can have a first operational mode in which the system light source 16 is off, which generally occurs during daylight hours or generally from dawn until dusk. The system 10 can have a second operational mode in which the system light source 16 is on, which generally occurs during the night hours or generally from dusk until dawn. The first operational mode can end and the second operational mode can commence upon the detection of a first criterion. The second operational mode can end and the first operational mode can begin upon the occurrence of a second criterion. Examples of the first and second criterion will be described below.

The controller 18 can be operatively connected to control the flow of electrical energy between the energy source 14 and the system light source 16 to selectively implement the first and second operational modes. The term "selectively implemented" and variants thereof means that the controller 18 can determine the appropriate operational mode to apply based on, at least in part, data received by the modulation detector 20. The controller 18 can be comprised of any suitable combination of hardware or software.

The controller 18 can selectively adjust the flow of electrical energy between the electrical energy source 14 and the system light source 16 responsive to the electrical signals from the sensor. The electrical signals can have a modulated component and/or a non-modulated component. The controller 18 can adjust the flow of electrical energy in response to the non-modulated component and not adjust the flow of electrical energy in response to the modulated component. The modulation detector 20 can facilitate the operation of the controller 18 in any of a number of ways. The modulation detector 20 can filter or process the modulated component of the electrical energy generated by the sensor 18 so that such modulated component is not presented to the controller 18 or so that such modulated component is processed in such a way that it is distinct from the non-modulated component.

In one implementation of the invention, a modulation detector 20 can filter and thus effectively ignore (that is, not respond to) any portion of the electrical energy generated by the sensor 12 that is attributed to manmade light sources, that is, a modulated component of the electrical energy. As a result, only electrical energy from natural light sources may pass through the modulation detector 20 to the controller 18, which, as described above, is responsive to non-modulated signals and is not responsive to modulated signals. Electrical energy and the associated incident light metric of energy generated from a manmade light source are typically time-varying in nature, similar to an alternating current. The modulation detector 20 can analyze the received signal to detect whether a particular modulation is present, as will be explained in more detail below.

The controller 18 can alter the operational mode of the system based on the detection of a first criterion or a second criterion, as noted above. The first criterion and the second criterion can be associated with characteristics of sunrise and sunset. For example, the first criterion and the second criterion can be threshold incident light metrics (current and/or voltage) of energy attributable to a natural light source. For instance, if the non-modulated component of the electrical energy generated by the sensor 12 is sufficiently low, then the controller 18 can assume that the sun is down and that the system light should be activated. The controller 18 can adjust the flow of electrical energy to the system light accordingly. If the non-modulated component of the electrical energy generated by the sensor 12 is sufficiently high, then the controller 18 can assume that the sun is up and that the system light should be activated. The controller 18 can adjust the flow of electrical energy to the system light accordingly.

Alternatively or in addition, the first and second criterion can be changes in the incident light metrics (current and/or voltage) of energy attributable to a natural light source. For example, the first criterion can be a slope of an incident light metric that is associated with sunrise, and the second criterion can be a slope of an incident light metric that is associated with sunset.

The modulation detector 20 can be any component or group of components capable of receiving any information and processing such information to control or send control signals to assist in the selective operation of the system light source 16. The modulation detector 20 can be comprised of any suitable combination of hardware or software. In one embodiment, the modulation detector 20 can be part of the controller 18. For example, the modulation detector 20 can be software installed on the controller 18. In another embodiment, the modulation detector 20 can be separate from the controller 18 but operatively connected thereto. As an example, the modulation detector 20 can be a component separate from the controller 18.

Figure 2:
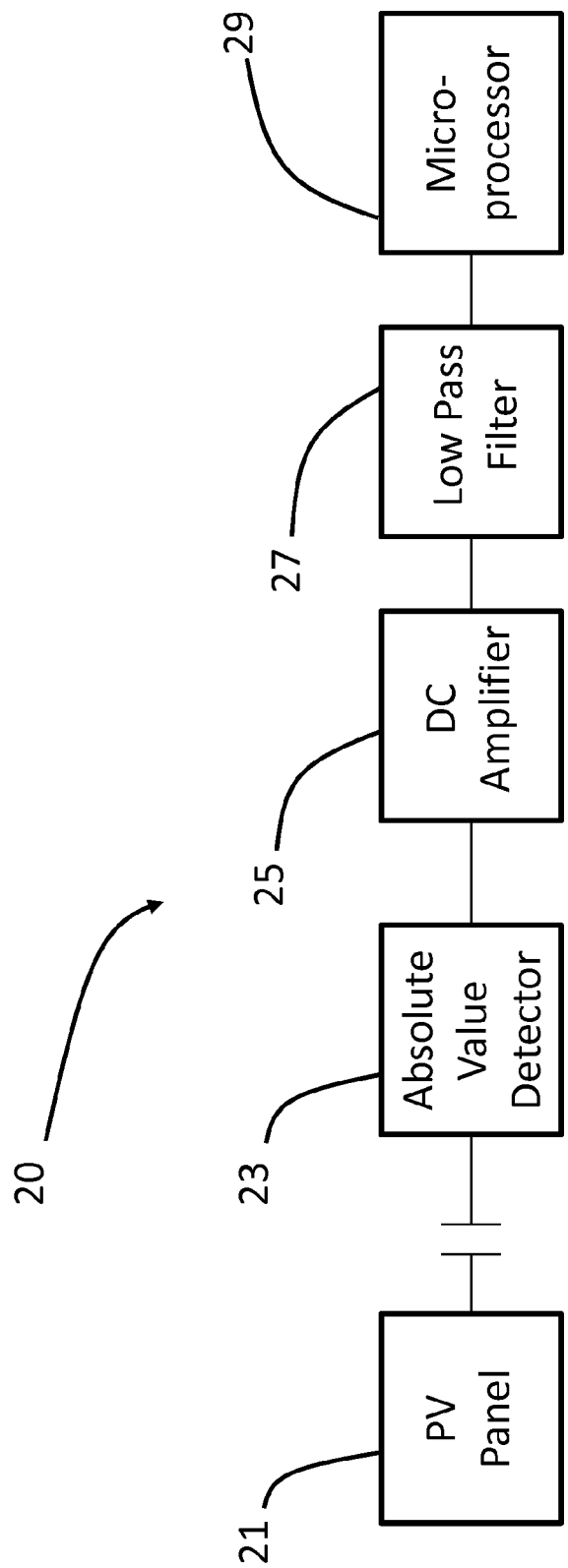
FIG. 2 shows a block diagram of a modulation detector according to aspects of the invention.

FIG. 2 shows an example of a block diagram of a modulation detector 20. It will be understood that various types of modulation detectors 20 are contemplated within the scope of the invention, and the modulation detector 20 is not limited to the example shown in FIG. 2 or to any specific circuit, software and/or device. FIG. 2 is presented without any particular values associated with the individual components of the circuit because the actual values will vary depending on the particular system and application.

The modulation detector 20 can include a photovoltaic cell, array or panel 21, an absolute value detector 23, a direct current amplifier 25, a low pass filter 27 and a microprocessor 29. The photovoltaic panel 21 can be operatively connected to the absolute value detector 23. In one embodiment, the photovoltaic panel 21 can be capacitively coupled to the absolute value detector 23. Thus, direct current signals generated by the photovoltaic panel 21, such as would be generated by solar and lunar radiation, are not coupled to the absolute value detector 23. Illumination energy with an alternating current component that is within a predetermined range can be coupled and can be rectified by the absolute value detector 23. In one embodiment, the predetermined range can be from about 10 Hz to about 100 kHz. In one embodiment, the absolute value detector 23 can be a window comparator. In one embodiment the absolute value detector 23 can be a rectifier.

The absolute value detector 23 can be operatively connected to the direct current amplifier 25. Thus, the resultant direct current signal from the absolute value detector 23 can be amplified by the direct current amplifier 25 for measurement. The direct current amplifier 25 can have any suitable gain. In one embodiment, the gain of the direct current amplifier can be about 10.

The direct current amplifier 25 can be operatively connected to the low pass filter 27. Thus, an amplified signal from the direct current amplifier 25 can be coupled to the low pass filter 27. The low pass filter 27 can have any suitable characteristics, such as such as to be configured with a Tc of 1.0 seconds. The low pass filter 27 can be operatively connected to the microprocessor 29, which can have an analog to digital (A/D) input. The signal from the low pass filter 27 can be processed by the A/D input of the microprocessor 29.

This circuit can supply an in-band qualified DC voltage to the microprocessor 29 within the associated voltage in (Vin) range of the microprocessor. Threshold detection and other screening techniques can be accomplished in the microprocessor software.

The modulation detector 20 and/or the controller 18 can collect any information to control or send control signals to assist in the selective operation of the system. For instance, such information can be used for customized control of the system light source 16.

The system 10 can include an interface 26 that can receive data from any suitable network 28. It will be understood that the term "network" can include one or more components designed to transmit information from one source to another. The transmission can be achieved in any suitable manner, such as by a hardwire connection or wirelessly. In some instances, the interface 26 can also transmit data from the modulation detector 20 and/or the controller 18 to the network 28. In one embodiment, the modulation detector 20 can receive information regarding one or more modulations for identification. The modulation detector 20 can also receive information regarding the first and second criterion, including threshold incident light metric levels from natural light sources and/or incident light metric slopes or ranges of incident light metric slopes generally corresponding to sunrise and sunset.

In use, one or more external light sources 30 can be located sufficiently proximate the system 10 such that light from these external light sources 30 can impinge on the sensor 12. One of the external light sources 30 can be a natural light source 32, such as the sun. Alternatively or in addition, the external light sources 30 can also include one or more manmade light sources 34. The manmade light source 34 can be any non-natural source of light. For instance, the manmade light sources 34 can be part of an outdoor lighting system, such as street lights 36, stadium lights 38, signage, advertising displays or decorative lights like holiday lights, just to name a few possibilities.

The system 10 can be adapted to distinguish between light from manmade sources 34 and light from natural sources 32.

With this ability, the system 10 can ensure that the system light source 16 does not cycle between the first and second operational modes at undesired times. In particular, the system 10 can ensure that the system light source 16 is not turned off during the nighttime. There are various ways in which the system 10 can achieve such results.

In some instances, the light emanating from the system light source 16 and/or the one or more external lights can be modulated. The terms "modulated," "modulation" and variations thereof means purposefully altering at least one characteristic of the light emitted by the system light source 16 and/or the external manmade light sources 34 from its normal state. Any suitable type of modulation can be applied to the light from such manmade light sources 16, 34. The modulation may be in a form that is not perceptible to one or more human senses. More particularly, the modulation may be in a form that is not perceptible to the human eye. The modulation can be added to the light in any suitable manner. In some instances, certain types of lights (including fluorescent, high pressure sodium, mercury vapor, low pressure sodium) naturally produce measurable modulations. In such cases, it may not be necessary to add modulation to the light. Indeed, the light from most manmade sources is naturally modulated. However, the addition of specific modulations to such manmade light sources can be helpful in distinguishing between individual light sources and in reacting or quantifying them separately. In such case, the modulation can be predetermined.

Examples of modulation include variations in amplitude, waveform, phase and/or frequency. In one embodiment, the modulation can be in the form of a plurality of pulses. For instance, when the system light source 16 and/or the one or more external, manmade light sources 34 are initially turned on, the light can be controlled to rapidly alternate between a predetermined maximum light intensity and a predetermined minimum light intensity, which may or may not be zero, to thereby create a series of pulses. These pulses can be at a frequency that is not detectable by the human eye. The sequence of pulses can be applied such that the amount of time the light is at the maximum light intensity is greater than the amount of time the light is at the minimum light intensity. Thus, the average light intensity over the period of modulation will be closer to the maximum light intensity than the minimum light intensity, thereby minimizing any overall reduction in light intensity.

The modulation can appear when the system light source 16 and/or manmade light sources 34 are initially turned on or at a later time. Alternatively or in addition, the modulation can appear at any regular or irregular interval or even randomly. Still alternatively, the modulation may be present during the entire time the light is illuminated. The modulation is an indicator that the light energy is emanating from a manmade source.

The modulation detector 20 can be configured to identify such modulation and thereby distinguish between light from manmade sources 16, 34 and light from natural sources 32. The modulation detector 20 can also distinguish between a plurality of manmade light sources, which may or may not have different modulation. If modulation is detected, the modulation detector 20 will understand that the light energy with such modulation is not from a natural light source.

When the light from the manmade sources 16, 34 is converted by the sensor 12 into electrical signals, any modulation in the light from the manmade sources 16, 34 will appear in the electrical signals, such as in the associated incident light metric. As a result, the electrical signals can have a modulated component and/or a non-modulated component. Thus, the modulation detector 20 and/or the controller 18 can be configured or programmed to ignore the modulated component of any electrical signals generated by the sensor 12, thereby not affecting the current operational mode of the system 10 or at least not being considered in the determination of whether to alter the current operational mode of the system 10. For instance, when the system light source 16 is on at night, any light received by the sensor 12 from the manmade sources 16, 34 will be disregarded so that the system light source 16 will remain on as intended. Thus, the system 10 will not be fooled into turning the system light source 16 off based on light from manmade sources 16, 34.

A system according to aspects of the invention can be configured to detect any modulation. Thus, it can detect any type of modulation from any light impinging on the sensor 12, regardless of the particular location of the system. Indeed, such a system may be employed in diverse settings with no commonality with respect to the type and quantity of light impingement between such settings. Moreover, the different lights that may impinge on the sensor may change over time, such as when a new lighting system is installed nearby. In some instances, it may be possible to configure the system to look for one or more specific modulations based on knowledge or information about the nearby lights.

It will be appreciated that systems and methods according to aspects of the invention can provide significant benefits. For instance, the system light will remain on during the intended operational period. The problems of prior systems being susceptible to repeated on-off cycling due to light received from the system light or external manmade lights are avoided. Thus, greater flexibility, accuracy of measurement, and lighting control can be realized in a multi source environment.

The foregoing description is provided in the context of various systems and methods for distinguishing between manmade and natural light sources. It will of course be understood that the invention is not limited to the specific details described herein, which are given by way of example only, and that various modifications and alterations are possible within the scope of the invention.

What is claimed is:

1. A lighting system comprising:
a system light source that is at least partially powered by an electrical energy source, the system light source emitting system light when activated, the system light including modulation;
a sensor adapted to convert light received thereby into electrical signals, said sensor generating electrical signals having a modulated component when the system light impinges on the sensor, said sensor generating electrical signals having an non-modulated component when natural light impinges on the sensor;
a controller for selectively adjusting the flow of electrical energy between the electrical energy source and the system light source responsive to the electrical signals from the sensor, said controller adjusting the flow of electrical energy in response to the non-modulated component and not adjusting the flow of electrical energy in response to the modulated component.

2. The lighting system of claim 1, further comprising a modulation detector operatively connected to receive the electrical signals from the sensor and detect any modulated component, the modulation detector filtering the modulated component in the electrical signals sent to the controller.

3. The lighting system of claim 1 wherein the sensor is at least one solar cell.

4. The lighting system of claim 1 wherein the sensor is one of a photo detector or a photodiode.

5. The lighting system of claim 1 wherein the modulation is a predetermined modulation.

6. The lighting system of claim 1 wherein the modulation is not perceptible to the human eye.

7. The lighting system of claim 1 wherein the modulation is a variation in at least one of amplitude, waveform, phase or frequency of the light emitted from the system light source.

8. The lighting system of claim 1 wherein a predetermined modulation is applied to the light from the system light source only during an initial interval when the system light source is activated.

9. The lighting system of claim 1 wherein the light from the system light source is modulated continuously while the system light source is activated.

10. The lighting system of claim 1 wherein the light from the system light source is modulated periodically while the system light source is activated.

11. The lighting system of claim 1 wherein the energy source is an energy storage device operatively connected to supply electrical energy to the system light source.

12. The lighting system of claim 11 wherein the energy storage device is a battery.

13. The lighting system of claim 1 wherein the energy source is an electrical grid operatively connected to supply electrical energy to the system light source.

14. The lighting system of claim 1 wherein the energy source is operatively connected to the sensor to receive and store electrical signals generated by the sensor.

15. A lighting system comprising:
a system light source that is at least partially powered by an electrical energy source;
a sensor adapted to convert light received thereby into electrical signals, the sensor receiving light from an external manmade light source that emits light including a modulation such that the electrical signals generated by the sensor include at least a modulated component;
a controller for selectively adjusting the flow of electrical energy between the electrical energy source and the system light source responsive to the electrical signals from the sensor, said controller adjusting the flow of electrical energy in response to non-modulated component and not adjusting the flow of electrical energy in response to the modulated component.

16. The lighting system of claim 15 further comprising a modulation detector operatively connected to receive the electrical signals from the sensor, the modulation detector being operatively connected to the controller to selectively increase or decrease the supply of electrical energy from the energy source to the system light source, the modulation detector being configured to detect the modulated component in the electrical signals generated by the sensor such that, when the modulated component is detected by the modulation detector, the modulated component is ignored.

17. The lighting system of claim 15 wherein the sensor is at least one solar cell.

18. The lighting system of claim 15 wherein the sensor is one of a photo detector or a photodiode.

19. The lighting system of claim 15 wherein the modulation is a predetermined modulation.

20. The lighting system of claim 15 wherein the modulation is not perceptible to the human eye.

21. The lighting system of claim 15 wherein the modulation is a variation in at least one of amplitude, waveform, phase or frequency of the light emitted from the external light source.

22. The lighting system of claim 15 wherein the modulation is applied to the light from the external light source only at the time the external light source is activated.

23. The lighting system of claim 15 wherein the modulation is applied to the light from the external light source continuously while the external light source is activated.

24. The lighting system of claim 15 wherein the modulation is periodically applied to the light from the external light source while the external light source is activated.

25. The lighting system of claim 15 wherein the external light source is one of street lights, stadium lights, signage, advertising displays or decorative lights.

26. The lighting system of claim 15 wherein the system light source emits light when activated, the light having a second modulation, wherein the sensor receives light from the system light source such that the electrical signals generated by the sensor include at least a modulated component corresponding to the second modulation, and
wherein, when the modulated component corresponding to the second modulation is detected by the modulation detector, the modulated component corresponding to the second modulation is ignored.

27. The lighting system of claim 26 wherein the modulation and the second modulation are different.

28. The lighting system of claim 15 wherein the energy source is operatively connected to the sensor to receive and store electrical signals generated by the sensor.

* * * * *